United States Patent
Tagawa et al.

(10) Patent No.: US 7,053,290 B2
(45) Date of Patent: May 30, 2006

(54) MUSIC REPRODUCING APPARATUS AND MUSIC REPRODUCING METHOD

(75) Inventors: Junichi Tagawa, Hirakata (JP); Hiroaki Yamane, Kadoma (JP); Masako Ono, Osaka (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 107 days.

(21) Appl. No.: 10/868,830

(22) Filed: Jun. 17, 2004

(65) Prior Publication Data

US 2004/0260539 A1  Dec. 23, 2004

(30) Foreign Application Priority Data

Jun. 19, 2003  (JP) .................................... 2003-175026

(51) Int. Cl.
*G10H 7/00* (2006.01)
*G04B 13/00* (2006.01)

(52) U.S. Cl. ........................................ 84/609; 84/615
(58) Field of Classification Search ................ 84/609, 84/615, 634
See application file for complete search history.

(56) References Cited

U.S. PATENT DOCUMENTS

| | | |
|---|---|---|
| 5,616,876 A | 4/1997 | Cluts |
| 6,201,176 B1 * | 3/2001 | Yourlo ........................ 84/609 |
| 6,846,979 B1 * | 1/2005 | Kondo ........................ 84/609 |
| 2002/0130898 A1 | 9/2002 | Ogawa et al. |
| 2002/0172372 A1 | 11/2002 | Tagawa et al. |
| 2003/0205124 A1 * | 11/2003 | Foote et al. .................. 84/608 |
| 2003/0221541 A1 * | 12/2003 | Platt ............................ 84/609 |

FOREIGN PATENT DOCUMENTS

| | | |
|---|---|---|
| EP | 1241588 A2 | 9/2002 |
| EP | 1244093 A2 | 9/2002 |
| JP | 11-306740 | 11/1999 |

* cited by examiner

*Primary Examiner*—Jeffrey W Donels
(74) *Attorney, Agent, or Firm*—Wenderoth, Lind & Ponack, L.L.P.

(57) ABSTRACT

A candidate piece specifying unit 6 specifies, as a first candidate piece, a musical piece whose musical piece parameter includes a first factor that is larger than a first factor of a musical piece currently being played from among musical pieces, and specifies, as a second candidate piece, a musical piece whose first factor is smaller than the first factor of the musical piece currently being played from among the musical pieces. When data of a musical piece is reproduced by a playback unit 4, a display control unit 8 causes musical piece information regarding the first candidate piece and the second candidate piece to be displayed at positions on a display screen that reflect coordinate positions in an impression space formed by the factors of the musical piece parameter. Upon receiving an input from a user of specifying a musical piece indicated by musical piece information displayed on a display device 10, a playback control unit 5 controls data of the specified musical piece so that the data of the specified musical piece is reproduced by the playback unit.

13 Claims, 6 Drawing Sheets

MUSIC REPRODUCING APPARATUS AND MUSIC REPRODUCING METHOD

BACKGROUND OF THE INVENTION

1. Field of the Invention

The present invention relates to music reproducing apparatuses and, more specifically, to a music reproducing apparatus that presents search results using musical piece parameters to a user.

2. Description of the Background Art

As one example of a conventional technology (hereinafter, a first conventional technology), a style of listening to a musical piece through a music reproducing apparatus, such as a CD player, generally incorporated in a car audio system is described below with reference to FIG. 6.

Figure 6:
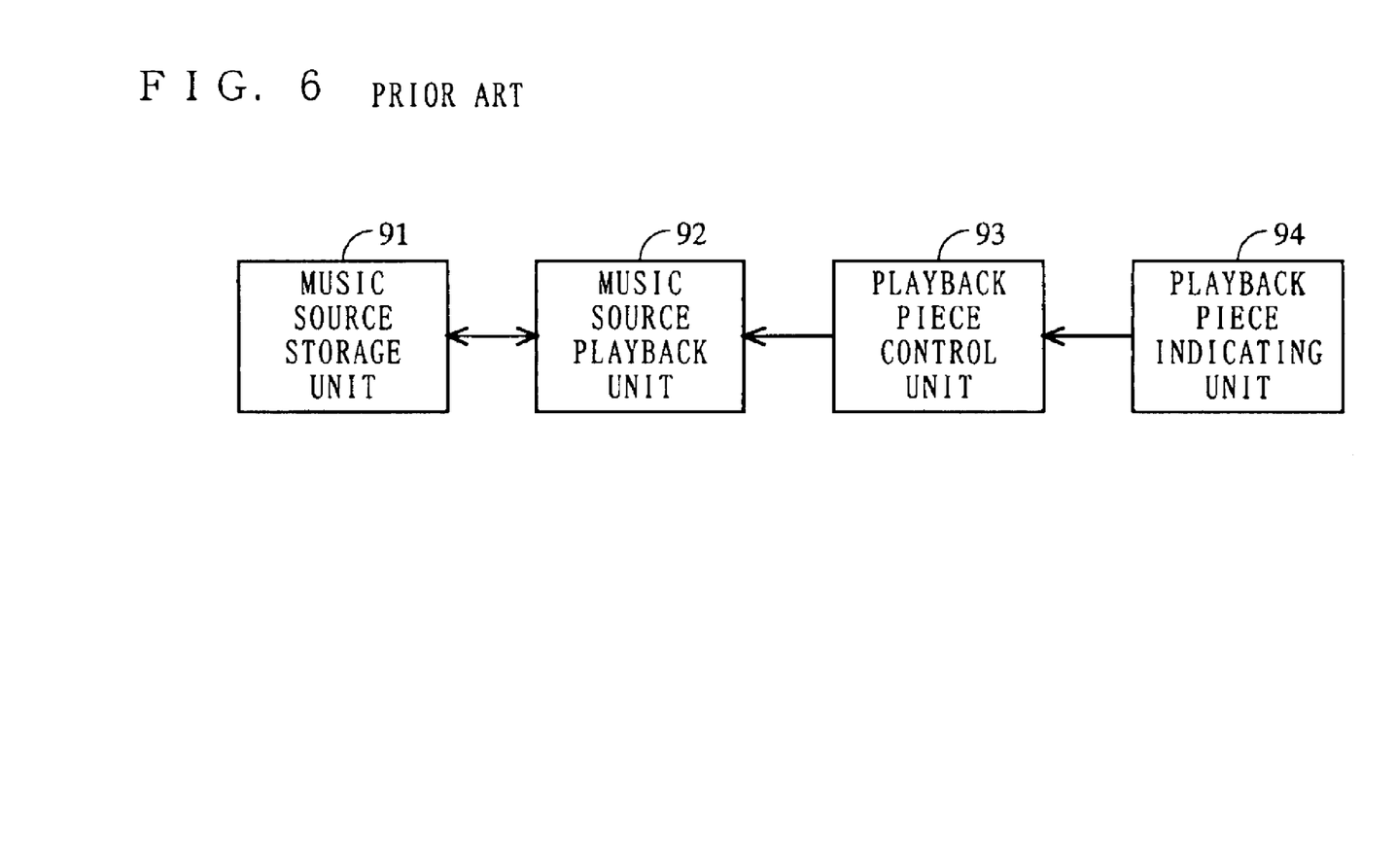
FIG. 6 is an illustration showing the structure of a conventional music reproducing apparatus.

In FIG. 6, the music reproducing apparatus includes a music source storage unit 91, a music source playback unit 92, a playback piece control unit 93, and a playback piece indicating unit 94. The music source storage unit 91 is implemented by an audio CD, for example, storing data of musical pieces (music source). The music source playback unit 92 plays the musical pieces stored in the music source storage unit 91. The playback piece control unit 93 controls playback of the music source playback unit 92. The playback piece indicating unit 94 includes an input unit, such as buttons, to indicate a playback piece to the playback piece control unit 93 in accordance with an input operation by a user.

To listen to a music source stored in the music source storage unit 91, the user generally listens to the musical pieces in predetermined order. That is, when the musical pieces stored in the music source storage unit 91 are played, the music source playback unit 92 normally plays the musical pieces in recording order, such as in recording order of an audio CD. Alternatively, the musical pieces are played in the order designated in advance by the user.

If the user does not like the musical piece currently being played, the user can skip the musical piece or designate another musical piece desired, thereby allowing playback of musical pieces suited to his or her preferences. That is, upon reception of an instruction input from the user of skipping the musical piece currently being played, the playback piece indicating unit 94 instructs the playback piece control unit 93 to stop the musical piece and then play the next musical piece. Alternatively, upon reception of an instruction input from the user of a musical piece number, the playback piece indicating unit 94 instructs the playback piece control unit 93 to stop the musical piece currently being played and then play the musical piece of the musical piece number. As such, when the user does not like the musical piece currently being played, the user has to perform the above-described operation to select a musical piece suited to his or her preferences.

In another example of the conventional technology (hereinafter, a second conventional technology), the following music reproducing apparatus has been devised. That is, in the music reproducing apparatus of the second conventional technology, the user can set in advance his or her musical preferences. For example, only the musical pieces set as being suited to his or her preferences are played. According to the music reproducing apparatus of the second conventional technology, only the musical pieces set in advance as being suited to user's preferences can be automatically played.

In recent years, information processing devices having incorporated therein a large-capacity storage unit have been widely available. Also, the music data compression technology has been advanced. Therefore, music reproducing apparatuses capable of storing a large number of musical pieces are available these days.

However, if a music reproducing apparatus storing a large number of musical pieces uses the scheme of the first conventional technology, selecting desired musical pieces from those stored is extremely burdensome to users. This is because determining the listening order of a large number of musical pieces requires users to take much time and trouble. Even if the musical pieces are to be played in the recording order, the number of musical pieces is so large that setting skips or designating piece numbers requires users to take much time and trouble.

The music reproducing apparatus according to the second conventional technology allows only the desired musical pieces to be automatically played. Yet still, if the music reproducing apparatus according to the second conventional technology stores data of a large number of musical pieces, the burden on the user cannot be reduced. This is because the user has to set in advance desired musical pieces by himself or herself. That is, it is required to set in advance user's preference to all musical pieces to be played, thereby putting a large burden on the user. Moreover, user's preferences of musical pieces, that is, which music to be played, may vary depending on situations and circumstances. In the music reproducing apparatus of the second conventional technology, however, the user has to perform resetting every time the user's preferences of musical pieces are changed, thereby putting a large burden on the user.

SUMMARY OF THE INVENTION

Therefore, an object of the present invention is to provide a music reproducing apparatus that allows musical pieces to be played according to a user's mood without requiring the user to perform a burdensome operation, and a music reproducing method.

The present invention has the following features to attain the object mentioned above. That is, a first aspect is directed to a music reproducing apparatus that has a display device and plays a musical piece. The music reproducing apparatus includes a musical piece data storage unit, a parameter storage unit, a playback unit, a candidate piece specifying unit, a display control unit, and a playback control unit. The musical piece data storage unit stores data of a plurality of musical pieces. The parameter storage unit stores a musical piece parameter obtained by quantifying a feature of each musical piece and represented by at least one factor for each musical piece stored in the musical piece data storage unit. The playback unit reproduces data of the musical pieces stored in the musical piece data storage unit. The candidate piece specifying unit specifies, as a first candidate piece, a musical piece whose musical piece parameter includes a first factor that is larger than a first factor of a musical piece currently being played from among the musical pieces whose data is stored in the musical piece data storage unit, and also specifies, as a second candidate piece, a musical piece whose first factor is smaller than the first factor of the musical piece currently being played from among the musical pieces. When data of a musical piece is reproduced by the playback unit, the display control unit causes musical piece information regarding the first candidate piece to be displayed in a predetermined first direction from a reference position on a screen of the display device, and also causes musical piece information regarding the second candidate to be displayed in a second direction reverse to the first direction. Upon receiving an input from a user of specifying a musical piece indicated by musical piece information displayed on the display device, the playback control unit controls the playback unit so that the playback unit reproduces data of the specified musical piece.

Also, in a second aspect, the candidate piece specifying unit may specify, as a third candidate piece, a musical piece whose musical piece parameter includes a second factor that is different from the first factor and is larger than a second factor of the musical piece currently being played from among the musical pieces whose data is stored in the musical piece data storage unit, and may also specify, as a fourth candidate piece, a musical piece whose second factor is smaller than the second factor of the musical piece currently being played from among the musical pieces. At this time, when the data of the musical piece is reproduced by the playback unit, the display control unit causes musical piece information regarding the third candidate piece to be displayed in a third direction that is different from the first direction and the second direction, and causes musical piece information regarding the fourth candidate piece to be displayed in a fourth direction reverse to the third direction.

Furthermore, in a third aspect, the candidate piece specifying unit may specify, as a fifth candidate piece, a musical piece whose first factor is larger than a predetermined value from among the musical pieces whose data is stored in the musical piece data storage unit, and may also specify, as a sixth candidate piece, a musical piece whose first factor is smaller than the predetermined value from among the musical pieces. At this time, when the data of the musical piece is reproduced by the playback unit, the display control unit causes musical piece information regarding the fifth candidate piece to be displayed in the first direction, and also causes musical piece information regarding the sixth candidate piece to be displayed in the second direction.

Still further, in a fourth aspect, the candidate piece specifying unit may specify, as a seventh candidate piece, a musical piece whose first factor is larger than a first predetermined value and whose musical piece parameter includes a second factor that is different from the first factor and is larger than a second predetermined value from among the musical pieces whose data is stored in the musical piece data storage unit, may specify, as an eighth candidate piece, a musical piece whose first factor is larger than the first predetermined value and whose second factor is smaller than the second predetermined value from among the musical pieces, may specify, as a ninth candidate piece, a musical piece whose first factor is smaller than the first predetermined value and whose second factor is larger than the second predetermined value from among the musical pieces, and may specify, as a tenth candidate piece, a musical piece whose first factor is smaller than the first predetermined value and whose second factor is smaller than the second predetermined value from among the musical pieces. When the data of the musical piece is reproduced by the playback unit, the display control unit causes musical piece information regarding the seventh candidate piece to be displayed in the first direction, causes musical piece information regarding the tenth candidate to be displayed in the second direction, causes musical piece information regarding the eighth candidate piece to be displayed in a third direction that is different from the first direction and the second direction, and causes musical piece information regarding the ninth candidate piece to be displayed in a fourth direction reverse to the third direction.

Still further, in a fifth aspect, the display control unit may cause musical piece information regarding the musical piece whose data is currently being reproduced by the playback unit to be displayed at the reference position.

Still further, in a sixth aspect, the candidate piece specifying unit may use the musical piece parameter to specify, as a similar candidate piece, a musical piece whose musical piece parameter is similar to a musical piece parameter of the musical piece currently being played from among the musical pieces whose data is stored in the musical piece data storage unit. At this time, the display control unit causes musical piece information regarding the similar candidate piece to be displayed in the vicinity of the reference position.

Still further, in a seventh aspect, the candidate piece specifying unit may use the musical piece parameter to specify, as a similar candidate piece, a musical piece whose musical piece parameter is similar to a musical piece parameter of the musical piece currently being played from among the musical pieces whose data is stored in the musical piece data storage unit. At this time, the display control unit causes musical piece information regarding the similar candidate piece to be displayed at the reference position.

Still further, in an eighth aspect, the music reproducing apparatus further includes a musical piece type storage unit that stores a plurality of pieces of information that are distinguished by using the musical piece parameters and are each indicative of a musical piece's type. At this time, the candidate piece specifying unit specifies, as a candidate piece, a musical piece of each type in accordance with the information stored in the musical piece type storage unit. The display control unit causes musical piece information regarding each candidate piece to be displayed on the display device so that a direction from the reference position on the screen of the display device to a position where the musical piece information is to be displayed is associated with a direction from a predetermined position to a position of each candidate piece in an impression space with each factor of the musical piece parameters being a coordinate axis.

Still further, in a ninth aspect, the playback control unit may receive an input for playback of a part of a musical piece indicated by the musical piece information displayed on the displayed device, and may control the playback unit so that the playback unit reproduces data of the part of the musical piece.

Still further, in a tenth aspect, the first factor may be represented by a value that is larger as the musical piece gives a more lively impression to listeners and is smaller as the musical piece gives a calmer impression to the listeners.

The present invention may be provided as a music reproducing method performed by the above music reproducing apparatus. Also, the present invention may be provided as a program that causes the music reproducing apparatus to achieve the above functions by being executed on a computer of the music reproducing apparatus, or a recording medium having recorded therein the program.

According to the first aspect, a plurality of types of candidate pieces are presented to the user. From these candidate pieces, the user can select a musical piece to be played later. Therefore, the user can cause various musical pieces to be played only with a selecting operation, and thus can cause musical pieces to be played according to a user's mood at that moment with a simple operation. Also, the musical piece information of each candidate piece is displayed so that the position on the display screen reflects the coordinate position in an impression space formed by factors of the musical piece parameter (refer to FIG. 4). Therefore, the user can recognize at a glance an impression each candidate piece gives, and thus can easily select a candidate piece. This allows more accurate selection of a musical piece according to a user's mood at that moment.

Also, according to the second aspect, the musical piece information is displayed so as to reflect the coordinate position in the impression space with respect to at least two factors included in the musical piece parameter. Therefore, the musical piece information is placed so as to two-dimensionally reflect the coordinate position in the impression space. This allows the user to more accurately recognize the feature of the musical pieces.

Furthermore, according to the third aspect, the fifth candidate piece and the sixth candidate piece are specified by a scheme not associated with the musical piece currently being played. Therefore, candidate pieces with more variety can be presented to the user, thereby increasing the alternatives the user has.

Still further, according to the fourth aspect, even for the candidate pieces specified by the scheme not associated with the musical piece currently being played, the musical piece information is displayed on the display screen so as to two-dimensionally reflect the coordinate value in the impression space. Therefore, the user can accurately recognize the feature of such candidate pieces.

Still further, according to the fifth aspect, the musical piece information of the musical piece currently being played is displayed at the reference position. This makes it possible to easily recognize the relation between each candidate piece and the musical piece currently being played.

Still further, according to the sixth and seventh aspects, the similar piece is further displayed as a candidate piece. Therefore, candidate pieces with more variety can be presented to the user, thereby increasing the alternatives the user has.

Still further, according to the eighth aspect, a plurality of types of musical pieces are presented to the user as candidate pieces. Furthermore, the musical piece information of each candidate piece is presented at a position on the screen so as to reflect a position in the impression space. Therefore, the user can recognize at a glace an impression of each of the various types of the musical pieces presented.

Still further, according to the ninth aspect, an opportunity to listen to the candidate pieces is offered to the user. This allows the user to more accurately recognize the contents of the candidate pieces, and to more accurately determine whether the candidate pieces are his or her desired ones.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
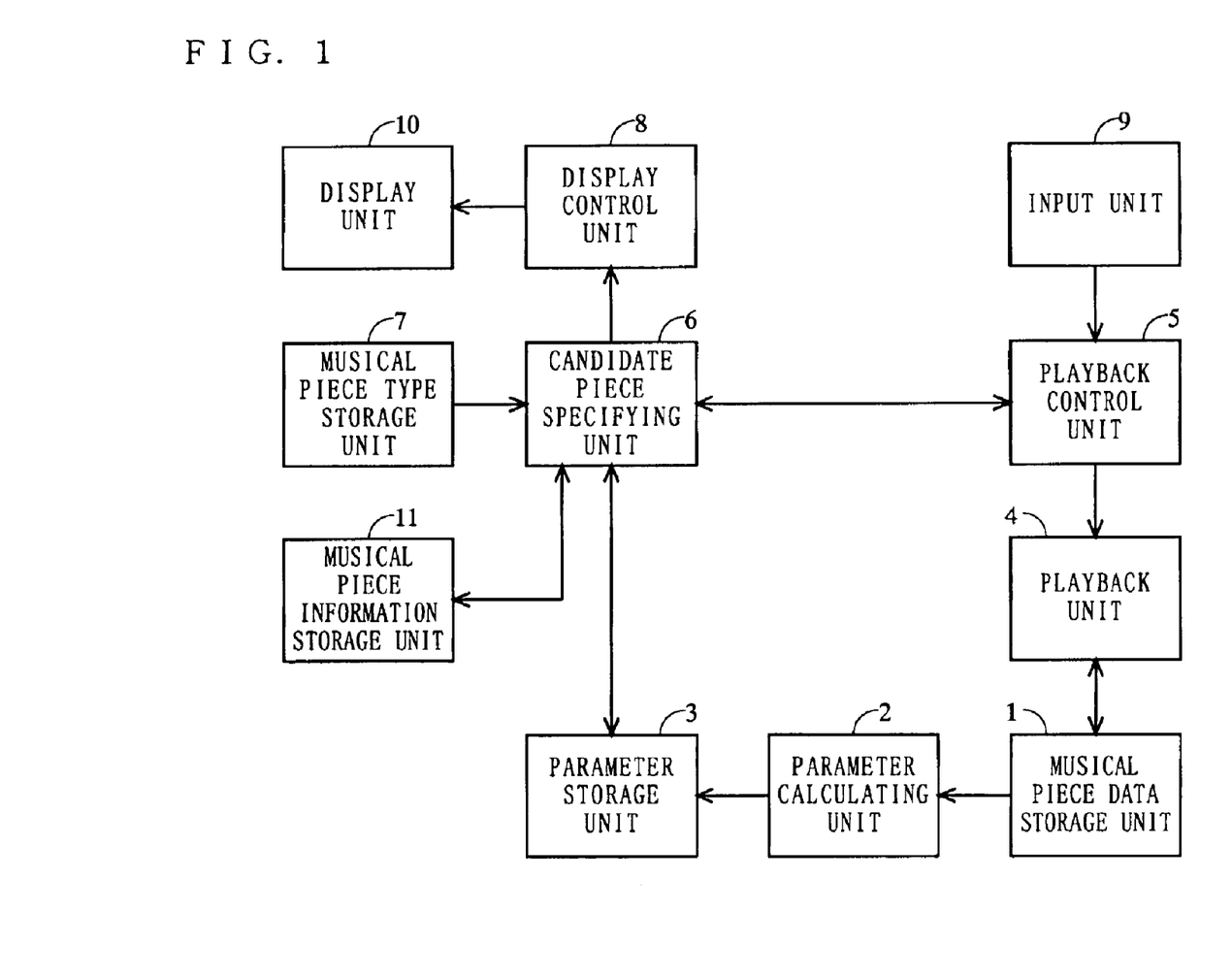
FIG. 1 is a block diagram showing the structure of a music reproducing apparatus according to a first embodiment of the present invention.

FIG. 1 is a block diagram showing the structure of a music reproducing apparatus according to a first embodiment of the present invention. In FIG. 1, the music reproducing apparatus includes a musical piece data storage unit 1, a parameter calculating unit 2, a parameter storage unit 3, a playback unit 4, a playback control unit 5, a candidate piece designating unit 6, a musical piece type storage unit 7, a display control unit 8, an input unit 9, a display unit 10, and a musical piece information storage unit 11. This music reproducing apparatus is implemented by a device having an input device and a display device and achieving the functions shown in FIG. 1 by a CPU executing a predetermined program. Also, this music reproducing apparatus is used as a car audio system, for example.

The musical piece data storage unit 1 stores data (audio signals) of musical pieces that can be played. Upon request from the playback unit 4, the musical piece data storage unit 1 outputs entire or part of the musical piece data to the playback unit 4 according to the request. For example, the musical piece data storage unit 1 is implemented by a recording medium, such as a CD, a hard disk drive (HDD), or a semiconductor memory. In the music reproducing apparatus shown in FIG. 1, each musical piece whose data is stored in the musical piece data storage unit 1 is uniquely set with an ID number. It is assumed herein that, when designating a musical piece, any component of the music reproducing apparatus uses the ID number.

The parameter calculating unit 2 calculates a musical piece parameter for each musical piece whose data is stored in the musical piece data storage unit 1. The musical piece parameter is a numerical value representing a quantified feature of the musical piece. Specifically, the musical piece parameter may represent an amount of a musical feature, such as tempo or beat, or an impression value obtained by quantifying an impression (for example, lively or cheerful) listeners have about the musical piece. Also, any method can be taken for calculating the musical piece parameter. One example of such a method is disclosed in Japanese Patent Laid-Open Publication No. 2002-278547.

In the first embodiment, the musical piece parameter is represented by two factors: an emotional factor and an active factor. The emotional factor and the active factor are both impression values obtained by quantifying an impression listeners have about the musical piece. The emotional factor is a scale representing a degree of humaneness of the musical piece (or a degree of a natural impression the musical piece gives). A musical piece having a large emotional factor gives an impression of being humane to listeners, whilst a musical piece having a small emotional factor gives an impression of being mechanical (or artificial/strongly rhythmical) to listeners. On the other hand, the active factor is a scale representing a degree of liveliness of the musical piece. A musical piece having a large active factor gives an impression of being lively to listeners. A musical piece having a small active factor gives an impression of being calm to listeners. The emotional factor and active factor can be calculated from the musical piece data by using a method disclosed in the above-mentioned Japanese Patent Laid-Open Publication No. 2002-278547.

Figure 2:
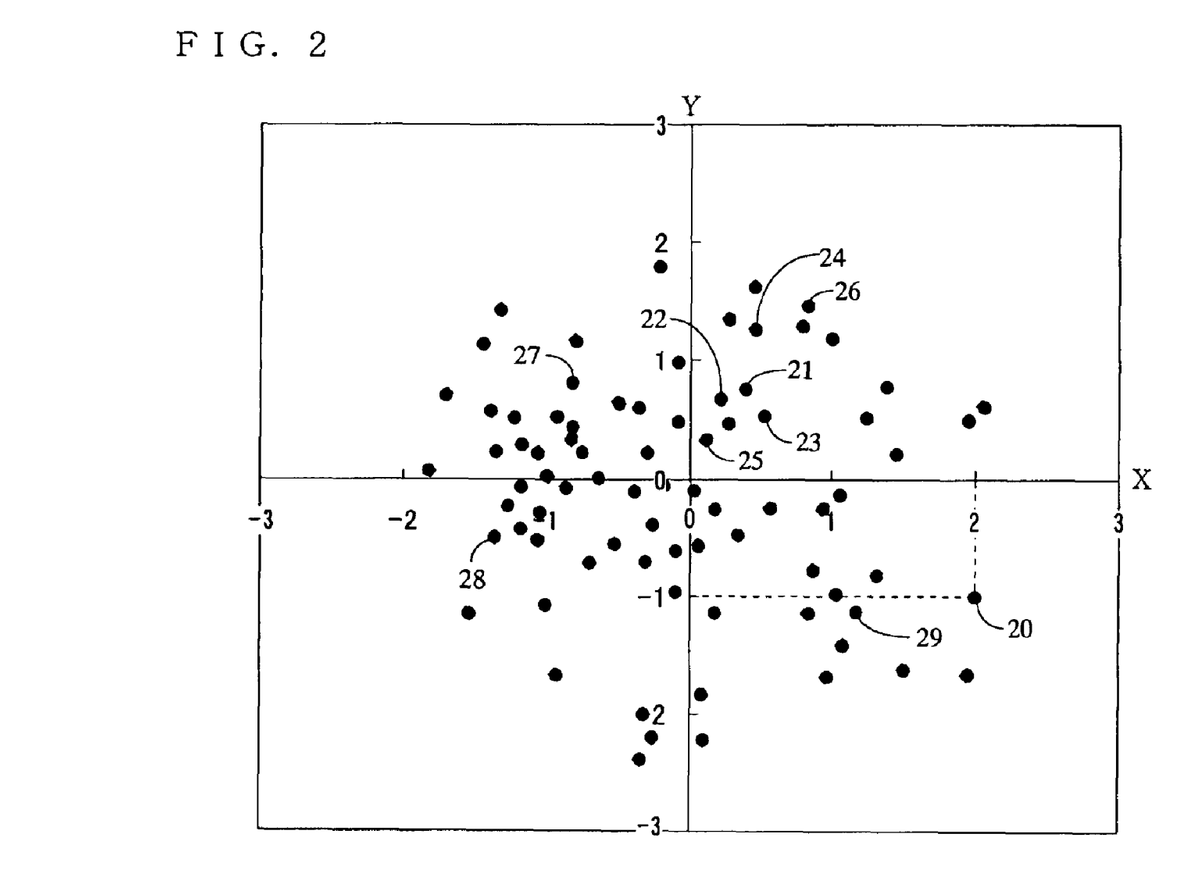
FIG. 2 is an illustration showing one example of an impression space in the first embodiment.

As described above, the musical piece parameter according to the first embodiment is represented by the above-mentioned two factors, that is, as a two-dimensional vector. Therefore, in the first embodiment, each musical piece whose data is stored in the musical piece data storage unit 1 is represented by a point on a plane with the emotional factor taken as the X axis and the active factor taken as the Y axis (hereinafter, "impression space"). FIG. 2 is an illustration showing one example of the impression space. For example, a musical piece with an emotional factor of "2" and an active factor of "−1" is represented by a point 20 with its coordinates (2, −1) on the impression space shown in FIG. 2. FIG. 2 is an illustration representing each musical pieces whose data is stored in the musical piece data storage unit 1 by points on the impression space. In FIG. 2, musical pieces represented by points located more rightward (in the positive direction along the X axis) give an impression of being more emotional, that is, more humane. Also, in FIG. 2, musical pieces represented by points located more upward (in the positive direction on along Y axis) give an impression of being more active, that is, livelier. Furthermore, a distance between points on the impression space represents a degree of similarity in impression between two musical pieces. Musical pieces whose points are close to each other on the impression space can be similar in impression to each other.

When data of a musical piece is stored in the musical piece data storage unit 1, the parameter calculating unit 2 reads that data of the musical piece when appropriate. Furthermore, based on the read data, the parameter calculating unit 2 calculates musical piece parameters. The calculated musical piece parameter is output to the parameter storage unit 3.

The parameter storage unit 3 stores the musical piece parameters calculated by the parameter calculating unit 2. The parameter storage unit 2 stores a musical piece parameter of each musical piece whose data is stored in the musical piece data storage unit 1. The data of each musical piece stored in the musical piece data storage unit 1 and the musical piece parameter of each musical piece stored in the parameter storage unit 3 are associated with each other by using the above-stated ID number. That is, the parameter storage unit 3 stores each musical piece parameter in association with its ID number. The musical piece parameter stored in the parameter storage unit 3 is output to the candidate piece specifying unit 6 upon request therefrom.

The musical piece information storage unit 11 stores musical piece information for each musical piece whose data is stored in the musical piece data storage unit 1. The musical piece information is information regarding the musical piece, including its title, artist name, jacket image of an album containing the musical piece, etc. The musical piece information is stored in association with the above-stated ID number. The musical piece information stored in the musical piece information storage unit 11 is output to the candidate piece specifying unit 6 upon request therefrom.

The candidate piece specifying unit 6 specifies musical pieces that can be candidates for playback next (hereinafter, candidate pieces) from among the musical pieces whose data is stored in the musical piece data storage unit 1. Here, at least two or more musical pieces are specified as candidate pieces. Also, in the first embodiment, the candidate piece specifying unit 6 specifies musical pieces of seven types as candidate pieces. These types of musical pieces specified as candidate pieces are determined by selection pattern information stored in the musical piece type storage unit 7. The selection pattern information indicates a type of a musical piece. The type of the musical piece is determined by the musical piece parameter of that musical piece. Furthermore, to specify candidate pieces, the candidate piece specifying unit 6 obtains and uses the musical piece parameter of each musical piece stored in the parameter storage unit 3. Still further, the candidate piece specifying unit 6 obtains the musical piece information of each of the specified candidate pieces from the musical piece information storage unit 11, and then outputs the obtained musical piece information to the display control unit 8. The ID numbers of the candidate pieces specified by the candidate piece specifying unit 6 are output as a candidate piece list to the playback control unit 5.

The musical piece type storage unit 7 stores the above-stated selection pattern information. This selection pattern information may be set in advance by the manufacture of the music reproducing apparatus or by the user. The selection pattern information stored in the musical piece type storage unit 7 is output to the candidate piece specifying unit 6 upon request therefrom.

The display control unit 8 causes the display unit 10 to display the musical piece information output from the candidate piece specifying unit 6 so that the musical piece information is placed according to a predetermined placement on a screen. The predetermined placement will be described in detail further below (refer to FIG. 4). The display unit 10 is implemented by a display device, such as a CRT.

The input unit 9 is implemented by an input device, such as buttons, a touch panel, and/or a keyboard. The input unit 9 receives an input from the user for specifying one of the musical pieces indicated by the musical piece information displayed on the display unit 10. Upon receiving the input from the user, the input unit 9 outputs information indicative of the musical piece specified by the user to the playback control unit 5.

The playback control unit 5 instructs the playback unit 4 to play back the musical piece specified by the user through the input unit 9. Specifically, based on the information indicative of the musical piece output from the input unit 9 and the candidate piece list output from the candidate piece specifying unit 6 the playback control unit 5 specifies the musical piece to be played, and then outputs the ID number of the specified musical piece to the playback unit 4. Also, the playback control unit 5 notifies the candidate piece specifying unit 6 of the musical piece to be played by the playback unit 4. That is, the playback control unit 5 outputs the ID number of the musical piece specified as being to be played to the candidate piece specifying unit 6.

In response to an instruction from the playback control unit 5, the playback unit 4 obtains data of the musical piece stored in the musical piece data storage unit 1. Specifically, the playback unit 4 obtains, from the musical piece data storage unit 1, data of the musical piece indicated by the ID number output from the playback control unit 5. Furthermore, the playback unit 4 reproduces part or all of the obtained musical piece data.

With the structure shown in FIG. 1, the music reproducing apparatus can present a plurality of candidate pieces to the user when the musical piece data is started to be reproduced. The user can specify a musical piece to be played next from among the plurality of candidate pieces. Therefore, the user does not have to select a desired piece from all musical pieces whose data is stored in the musical piece data storage unit 1, but can easily select a musical piece to be played next. Furthermore, in the music reproducing apparatus, musical pieces of various types are presented as candidate pieces to the user so that a general impression of each candidate piece can be known at a glance. The detailed operation of the music reproducing apparatus structured as shown in FIG. 1 is described below.

Figure 3:
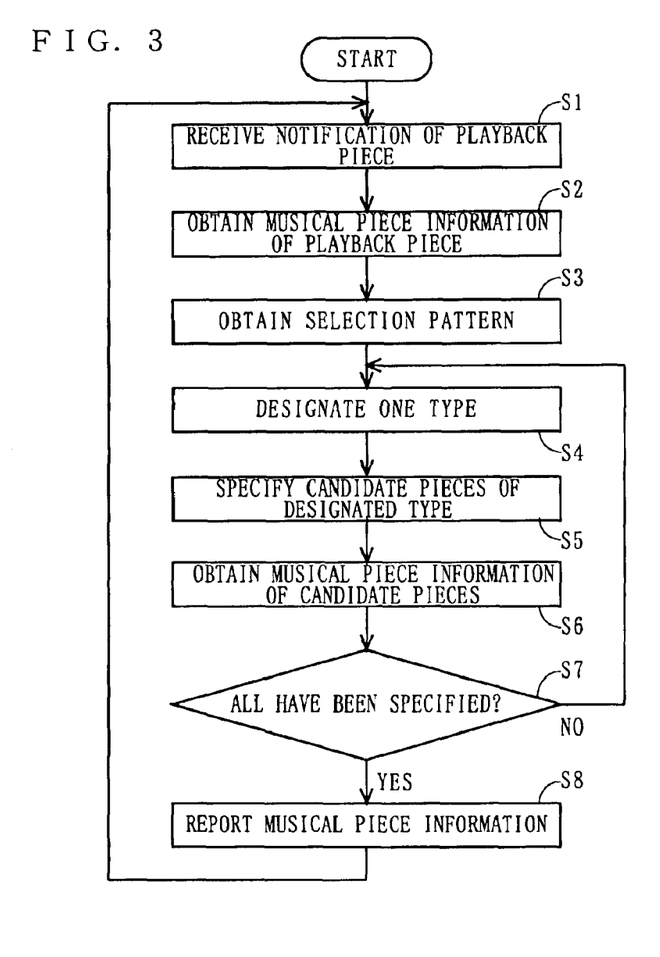
FIG. 3 is a flowchart showing a flow of a process performed by a candidate piece specifying unit 6.

FIG. 3 is a flowchart showing a flow of a process in the candidate piece specifying unit 6. It is assumed that, in the music reproducing apparatus shown in FIG. 1, unless otherwise provided with a particular user's operation, the playback control unit 5 controls the playback unit 4 so that the musical pieces are played in a predetermined order. The predetermined order can be arbitrary. For example, the musical pieces may be played in the recording order of the CD or in an order predetermined in advance by the user. Here, every time data of a new musical piece is started to be reproduced, the playback control unit 5 outputs the ID number of the musical piece to be played. The process shown in FIG. 2 is started upon output of the ID number of the musical piece from the playback control unit 5 to the candidate piece specifying unit 6.

In FIG. 3, in step S1, the candidate piece specifying unit 6 first receives a notification regarding the musical piece to be played by the playback unit 4. Next, in step S2, the candidate piece specifying unit 6 obtains the musical piece parameter and the musical piece information of the musical piece to be played by the playback unit 4. That is, the candidate piece specifying unit 6 notifies the parameter storage unit 3 of the ID number received from the playback control unit 5 to obtain the musical piece parameter of the musical piece indicated by the ID number from the parameter storage unit 3. Also, the candidate piece specifying unit 6 notifies the ID number received from the playback control unit 5 to the musical piece information storage unit 11 to obtain the musical piece information of the musical piece indicated by the ID number from the musical piece information storage unit 11.

Next, in step S3, the candidate piece specifying unit 6 obtains selection pattern information stored in the musical piece type storage unit 7. In the first embodiment, the selection pattern information includes the following Type 1 through Type 7.

Type 1: A musical piece (hereinafter, a "similar piece") that is similar in impression to the musical piece currently being played (hereinafter, "playback piece") (two such pieces are selected)

Type 2: A musical piece slightly livelier than the playback piece (one such piece is selected)

Type 3: A musical piece slightly calmer than the playback piece (one such piece is selected)

Type 4: A musical piece that is lively and humane (one such piece is selected)

Type 5: A musical piece that is lively and mechanical (one such piece is selected)

Type 6: A musical piece that is calm and mechanical (one such piece is selected)

Type 7: A musical piece that is calm and humane (one such piece is selected)

Upon obtaining the selection pattern information in step S3, the candidate piece specifying unit 6 specifies, in a loop from steps S4 through S7, a musical piece for each type included in the selection pattern. Specifically, in step S4, the candidate piece specifying unit 6 first designates one type for specifying a candidate piece. In step S4, a type that has not yet been designated in the loop from steps S4 through S7 is designated. Next, in step S5, the candidate piece specifying unit 6 specifies a candidate piece of the type designated in step S4 by using the musical piece parameters stored in the parameter storage unit 3. Here, a scheme of specifying a candidate piece varies according to the type. Hereinafter, a candidate piece specifying scheme is described for each type.

First, a candidate piece of Type 1 is a piece similar in impression to the playback piece, and is referred to herein as a similar piece. The similar piece is a piece whose coordinates on the impression space are located close to the coordinates of the playback piece. Therefore, in the first embodiment, two musical pieces whose coordinates are closest to the playback piece are specified as similar pieces. That is, in step S5, the candidate piece specifying unit 6 obtains the musical piece parameters stored in the parameter storage unit 3. Then, the candidate piece specifying unit 6 compares the obtained musical piece parameters and the musical piece parameter of the playback piece obtained in step S2 to specify similar pieces. In the example of FIG. 2, for a point 21 indicative of the coordinates of the playback piece, musical pieces indicated by points 22 and 23 are specified as candidate pieces of Type 1.

The candidate piece specifying unit 6 may randomly select candidate pieces of Type 1 from musical pieces within a predetermined distance away from the point indicative of the playback piece on the impression space. With this, every time a particular musical piece is played, musical pieces specified as candidate pieces of Type 1 can be varied.

Next, a candidate piece of Type 2 is a piece slightly livelier than the playback piece. The piece slightly livelier than the playback piece is a piece whose emotional factor is slightly larger than that of the playback piece, that is, a piece whose coordinates on the impression space are located slightly more upward (in the positive direction along the X axis) than those of the playback piece. A specific scheme of specifying a candidate piece of Type 2 may be any as long as it uses the musical piece parameters. For example, a candidate piece of Type 2 is randomly determined from among musical pieces that satisfy the condition that their emotional factor is larger than the emotional factor of the playback piece and a difference therebetween is within a predetermined range. At this time, in addition to the above condition, another condition may be added such that a difference in the active factor from the candidate piece is within a predetermined range. Also, a musical piece may be determined as the candidate piece if its emotional factor is larger than the emotional factor of the playback piece and a difference therebetween is minimum. In the example of FIG. 2, for the point 21 indicative of the coordinates of the playback piece, a musical piece indicated by a point 24 is specified as a candidate piece of Type 2.

Next, a candidate piece of Type 3 is a piece slightly calmer than the playback piece. The piece slightly calmer than the playback piece is a piece whose emotional factor is slightly smaller than that of the playback piece, that is, a piece whose coordinates on the impression space are located slightly more downward (in the negative direction along the X axis) than those of the playback piece. A specific scheme of specifying a candidate piece of Type 3 is similar to the scheme of specifying a candidate piece of Type 2. In the example of FIG. 2, for the point 21 indicative of the coordinates of the playback piece, a musical piece indicated by a point 25 is specified as a candidate piece of Type 3.

Next, a candidate piece of Type 4 is a piece that is lively and humane and is located in the upper right quadrant of the impression space, such as a rock 'n' roll-type musical piece. Specifically, the candidate piece specifying unit 6 randomly determines a candidate piece of Type 4 from among the musical pieces located in the upper right quadrant of the impression space. A candidate piece of Type 5 is a piece that is lively and mechanical and is located in the upper left quadrant of the impression space, such as a dance-type musical piece. The candidate piece specifying unit 6 randomly determines a candidate piece of Type 5 from among the musical pieces located in the upper left quadrant of the impression space. A candidate piece of Type 6 is a piece that is calm and mechanical and is located in the lower left quadrant of the impression space, such as a R&B-type musical piece. The candidate piece specifying unit 6 randomly determines a candidate piece of Type 6 from among the musical pieces located in the lower left quadrant of the impression space. A candidate piece of Type 7 is a piece that is calm and humane and is located in the lower right quadrant of the impression space, such as a ballad-type musical piece. The candidate piece specifying unit 6 randomly determines a candidate piece of Type 7 from among the musical pieces located in the lower right quadrant of the impression space. In the example of FIG. 2, a musical piece indicated by a point 26 is specified as a candidate piece of Type 4, a musical piece indicated by a point 27 is specified as a candidate piece of Type 5, a musical piece indicated by a point 28 is specified as a candidate piece of Type 6, and a musical piece indicated by a point 29 is specified as a candidate piece of Type 7. The candidate pieces of Types 1 through 3 are specified in association with the musical piece parameter of the playback piece, whilst those of Types 4 through 7 are specified irrespectively of the musical piece parameter of the playback piece.

After a candidate piece of any one of Types 1 through 7 is specified in step S5, in step S6, the candidate piece specifying unit 6 obtains the musical piece information of the specified candidate piece from the musical piece information storage unit 11. Furthermore, in step S7, the candidate piece specifying unit 6 determines whether candidate pieces have been specified for all types (in the first embodiment, Types 1 through 7). If it is determined in step S7 that candidate pieces have been specified for all types, the candidate piece specifying unit 6 performs a process of step S8. On the other hand, if it is determined in step S7 that candidate pieces has not yet been specified for at least one type, the candidate piece specifying unit 6 performs a process of step S4. Thereafter, the processes of steps S4 through S7 are repeated until candidate pieces are specified for all types.

Instep S8, the candidate piece specifying unit 6 causes the musical piece information of each candidate piece and the musical piece information of the playback piece to be displayed on the display control unit 8. That is, the candidate piece specifying unit 6 outputs the musical piece information obtained in steps S6 and S2 to the display control unit 8. At this time, the candidate piece specifying unit 6 outputs, for each piece of musical piece information, the musical piece information in association with information indicative of a position for display on the screen (position information). Note that the position information associated with the musical piece information of the playback piece is predetermined in advance, whilst the position information associated with the musical piece information of each candidate piece is predetermined for each type. That is, the musical piece information of each musical piece specified as the candidate piece for one type is displayed at the position predetermined for that type. After step S8, the candidate piece specifying unit 6 waits until a new musical piece is started to be played next. Then, when a new musical piece is started to be played by the playback unit 4, the processes of steps S1 through S8 are performed again.

With the operation of the candidate piece specifying unit 6 shown in FIG. 3, the musical piece information of the candidate piece of each type is output to the display control unit 8. The display control unit 8 then causes the musical piece information output from the candidate piece specifying unit 6 to be displayed on the display unit 10. Here, each piece of musical piece information is displayed at the location indicated by the position information mentioned above. The display screen having displayed thereon the musical piece information of the candidate pieces is described in detail below with reference to FIG. 4.

Figure 4:
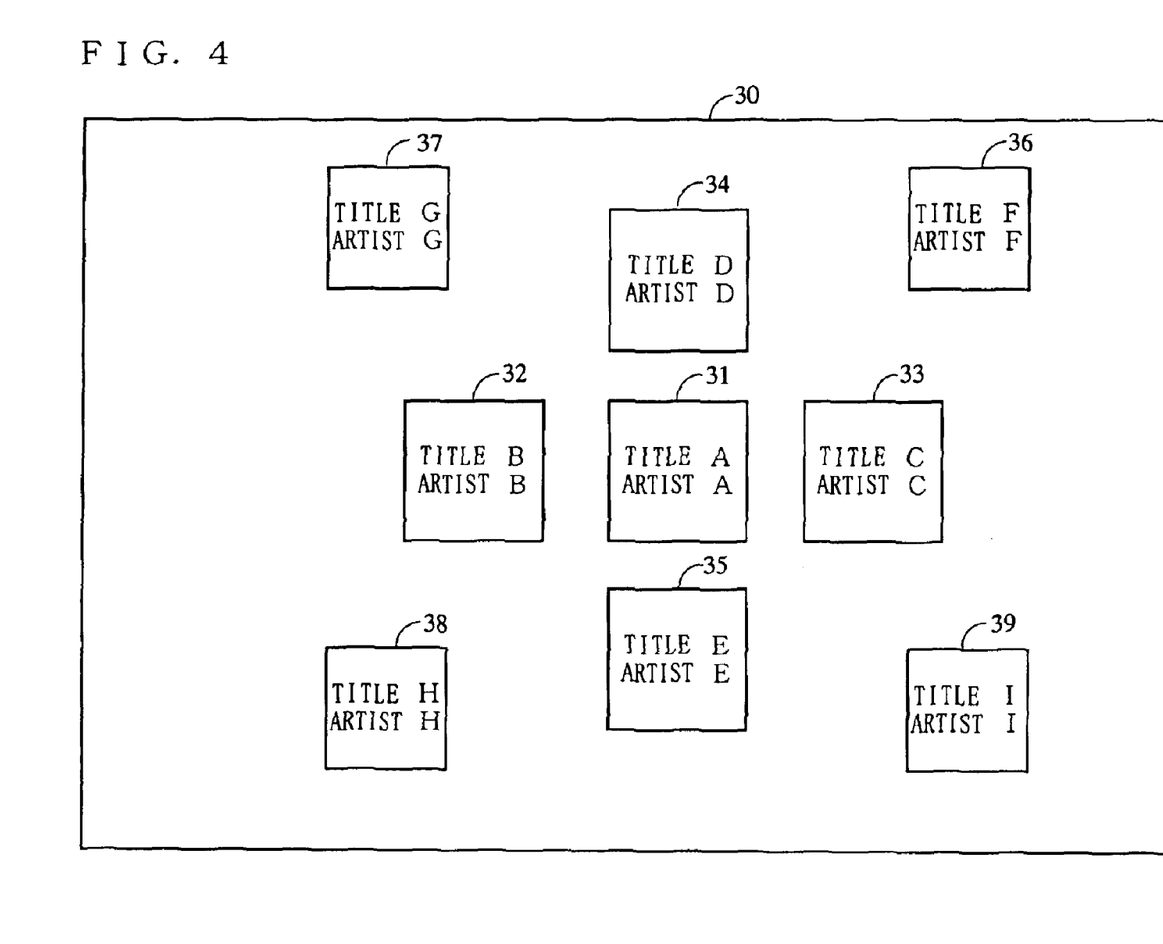
FIG. 4 is an illustration showing one example of a display screen for displaying candidate pieces according to the first embodiment.

FIG. 4 is an illustration showing one example of the display screen for displaying the candidate pieces according to the first embodiment. In FIG. 4, a display screen 30 has displayed thereon musical piece information 31 of the playback piece, and musical piece information 32 through 39 of the candidate pieces. In FIG. 4, a title and an artist name (singer name) are displayed on the screen as the musical piece information. However, the musical piece information can be any as long as it can identify the musical piece. For example, a jacket photo of a CD package containing the musical piece may be displayed.

In FIG. 4, the musical piece information 31 of the playback piece is displayed approximately at the center of the screen. The musical piece information 32 and 33 of the candidate pieces of Type 1 (similar pieces) are displayed in the vicinity of the musical piece information 31. In FIG. 4, the musical piece information 32 and 33 are displayed on both sides of the musical piece information 31. As shown in FIG. 4, with the musical piece information 32 and 33 being displayed in the vicinity of the musical piece information 31, it is possible to allow the user to intuitively realize that the musical pieces represented by the musical piece information 32 and 33 are similar to the playback piece. That is, the user can recognize at a glance that that the musical pieces represented by the musical piece information 32 and 33 are similar to the playback piece.

Also, in FIG. 4, the musical piece information 34 of the candidate piece of Type 2 is displayed on the upper side of the musical piece information 31. On the other hand, the musical piece information 35 of the candidate piece of Type 3 is displayed on the lower side of the musical piece information 31. Here, the candidate piece of Type 2 is a piece whose emotional factor is larger than that of the playback piece, whilst the candidate piece of Type 3 is a piece whose emotional factor is smaller than that of the playback piece. That is, in FIG. 4, the musical piece information of the piece whose emotional factor is larger than that of the playback piece is displayed upward of the musical piece information 31 of the playback piece, whilst the musical piece information of the piece whose emotional factor is smaller than that of the playback piece is displayed downward of the musical piece information 31 of the playback piece. As such, the musical piece information of the candidate piece is displayed so that a direction from a reference position on the screen of the display device to the position at which the musical piece information is to be displayed is associated with a direction from a predetermined position on the impression space to the position of the candidate piece. With the musical piece information being displayed at a position according to the magnitude of the factor of the musical piece parameter, it is possible to allow the user to intuitively recognize the impression of the musical piece represented by the musical piece information. That is, the user can intuitively recognize, through the display position of the musical piece information, the impression of the musical piece represented by the musical piece information in comparison with the playback piece.

Furthermore, in the first embodiment, the musical piece information of each candidate piece of not only Types 2 and 3 but also Types 4 through 7 is displayed so that a direction from the reference position on the screen of the display device to the position at which the musical piece information is to be displayed is associated with a direction from the predetermined position on the impression space to the position of the candidate piece. That is, in FIG. 4, the musical piece information 36 of the candidate piece of Type 4 is displayed upper-rightward of the musical piece information 31, that is, in an upper right portion of the screen 30. The musical piece information 37 of the candidate piece of Type 5 is displayed upper-leftward of the musical piece information 31, that is, in a upper left portion of the screen 30. The musical piece information 38 of the candidate piece of Type 6 is displayed lower-leftward of the musical piece information 31, that is, in a lower left portion of the screen 30. The musical piece information 39 of the candidate piece of Type 7 is displayed lower-rightward of the musical piece information 31, that is, in a lower right portion of the screen 30. Here, the candidate pieces of Types 4 and 5 are pieces whose emotional factor is larger than those of the candidate pieces of Types 6 and 7. Therefore, in FIG. 4, pieces whose emotional factor is relatively large are displayed on an upper side of the screen. Conversely, the candidate pieces of Types 4 and 7 are pieces whose active factor is larger than those of the candidate pieces of Types 5 and 6. Therefore, in FIG. 4, pieces whose active factor is relatively large are displayed on a right side of the screen, whilst pieces whose active factor is relatively small are displayed on a left side of the screen.

Consider the case where the user selects a musical piece desired to be played from among the musical pieces whose musical piece information is displayed on the display screen shown in FIG. 4. For example, when desiring to play a musical piece whose emotional factor is small, that is, a mechanical musical piece, the user selects a musical piece displayed on the left side of the screen. Also, when desiring to play a musical piece whose active factor is large, that is, a lively musical piece, the user selects a musical piece displayed on the upper side of the screen. As shown in FIG. 4, with the musical piece information being displayed according to the musical piece's impression, the impression of the musical piece whose musical piece information is displayed is very easy for the user to understand.

When desiring to listen to one of the displayed candidate pieces while viewing the display screen shown in FIG. 4, the user uses the input unit 9 to instruct playback of the desired candidate piece. For example, when the input unit 9 is a touch panel covering the display screen of the display unit 10, the candidate piece for playback can be designated with the user touching the musical piece information indicative of the desired candidate piece.

Upon receiving the instruction from the input unit 9 of playback of the musical piece, the playback control unit 5 controls the playback unit 4 so that the musical piece is played. With this, the playback unit 4 starts reproducing the data of the musical piece. At this time, the playback control unit 5 outputs the ID number of the musical piece started to be played to the candidate piece specifying unit 6. With this, new candidate pieces are presented to the user. When receiving the instruction from the input unit 9 of playback of the musical piece, the playback control unit 5 may stop the playback piece to start playing the musical piece, or may start playing the musical piece after the playback of the playback piece is completed.

As described above, according to the first embodiment, the candidate pieces selected by using the musical piece parameters from among the musical pieces whose data is stored in the musical piece data storage unit 1 are presented to the user. Here, the musical piece information of each candidate piece is displayed at a position on the display screen reflecting the coordinate position on the impression space (refer to FIG. 4). Therefore, the user can recognize at a glance the impression of each candidate piece, and therefore can easily select a desired candidate piece.

Also, according to the first embodiment, the candidate pieces are presented to the user every time a new musical piece is started to be played. Therefore, during the playback of the musical piece, the user can always select a musical piece desired to listen to next.

(Second Embodiment)

Next, a music reproducing apparatus according to a second embodiment of the present invention is described. The structure and operation of the music reproducing apparatus according to the second embodiment are similar to those of the music reproducing apparatus shown in FIG. 1. However, in the music reproducing apparatus according to the second embodiment, the musical piece parameter includes three factors. Also, in the second embodiment, types of musical pieces presented to the user as the candidate pieces are different from those in the first embodiment.

In the second embodiment, the musical piece parameter includes a cheerful/melancholic factor in addition to the emotional factor and the active factor. As with the emotional factor and the active factor, the cheerful/melancholic factor is a scale representing a degree of cheerfulness (melancholy) of the musical piece. That is, a musical piece whose cheerful/melancholic factor is large gives a cheerful impression to listeners, whilst a musical piece whose cheerful/melancholic factor is small gives a melancholic impression to listeners.

Figure 5:
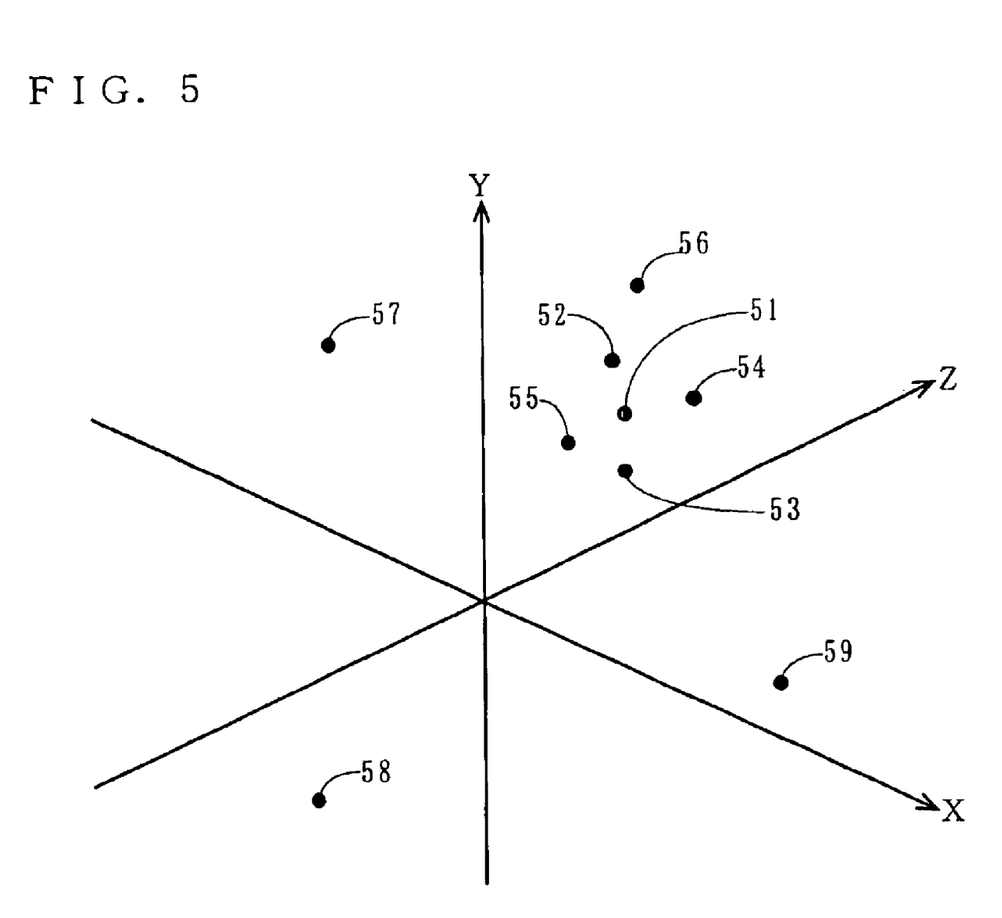
FIG. 5 is an illustration showing one example of an impression space in the second embodiment.

In the second embodiment, the musical piece parameter is represented as a three-dimensional vector. Therefore, in the second embodiment, each musical piece whose data is stored in the musical piece data storage unit 1 is represented by a point on the impression space with the emotional factor taken as the X axis, the active factor taken as the Y axis, and the cheerful/melancholic factor taken as the Z axis. FIG. 5 is an illustration showing one example of the impression space in the second embodiment. As shown in FIG. 5, in the second embodiment, the impression space is a three-dimensional space, and each musical piece is represented by a point on this three-dimensional space. Note that, for the sake of easy understanding of the drawing, FIG. 5 shows only the points indicative of the coordinates of the playback piece and the coordinates of the musical pieces specified as candidate pieces.

In the second embodiment, the pattern information stored in the musical piece type storage unit 7 indicates a selection pattern including the following Types 11 through 18.

Type 11: A musical pieces lightly livelier than the playback music (one such piece is selected)

Type 12: A musical piece slightly calmer than the playback piece (one such piece is selected)

Type 13: A musical piece that is slightly more cheerful than the playback piece (one such piece is selected)

Type 14: A musical piece that is slightly more melancholic than the playback piece (one such piece is selected)

Type 15: A musical piece that is lively and cheerful (one such piece is selected)

Type 16: A musical piece that is lively and melancholic (one such piece is selected)

Type 17: A musical piece that is calm and melancholic (one such piece is selected)

Type 18: A musical piece that is calm and cheerful (one such piece is selected)

In the second embodiment, Type 11 is identical to the above-described Type 2, and Type 12 is identical to the above-described Type 3. In the example of FIG. 5, for a point 51 indicative of the coordinates of the playback piece, a musical piece indicated by a point 52 is specified as a candidate piece of Type 11, and a musical piece indicated by a point 53 is specified as a candidate piece of Type 12.

The candidate piece of Type 13, that is, the musical piece that is slightly more cheerful than the playback piece, is a piece whose cheerful/melancholic factor is slightly larger than that of the playback piece, that is, a piece located at coordinates in the impression space in a slightly more positive direction along the Z axis from the coordinates of the playback piece. Also, the candidate piece of Type 14, that is, the musical piece that is slightly more melancholic than the playback piece, is a piece whose cheerful/melancholic factor is slightly smaller than that of the playback piece, that is, a piece located at coordinates in the impression space in a slightly more negative direction along the Z axis from the coordinates of the playback piece. To specify the candidate pieces of Type 13 and Type 14, a scheme similar to the scheme of specifying the candidate pieces of Type 2 and Type 3 can be taken. In the example of FIG. 5, for a point 51 indicative of the coordinates of the playback piece, a musical piece indicated by a point 54 is specified as a candidate piece of Type 13, and a musical piece indicated by a point 55 is specified as a candidate piece of Type 14.

The candidate piece of Type 15, that is, the musical piece that is lively and cheerful, is located in the upper right quadrant on a Y-Z plane in the impression space. One example of the candidate piece of Type 15 is a musical piece that gives a refreshing impression to listeners. When specifying a candidate piece of Type 15, the candidate piece specifying unit 6 randomly determines the candidate piece from among the musical pieces located on the upper right quadrant on the Y-Z plane in the impression space. The candidate piece of Type 16, that is, the musical piece that is lively and melancholic, is located in the upper left quadrant on the Y-Z plane in the impression space. One example of the candidate piece of Type 16 is a heavy-metal-type musical piece. The candidate piece of Type 17, that is, the musical piece that is calm and melancholic, is located in the lower left quadrant on the Y-Z plane in the impression space. One example of the candidate piece of Type 17 is a melancholic-ballad-type musical piece. The candidate piece of Type 18, that is, the musical piece that is calm and cheerful, is located in the lower right quadrant on the Y-Z plane in the impression space. One example of the candidate piece of Type 18 is a cheerful-ballad-type musical piece. A specific scheme of specifying a candidate piece of each of Types 16 through 18 is similar to the scheme of specifying a candidate piece of Type 15. In the example of FIG. 5, a musical piece indicated by a point 56 is specified as a candidate piece of Type 15, a musical piece indicated by a point 57 is specified as a candidate piece of Type 16, a musical piece indicated by a point 58 is specified as a candidate piece of Type 17, and a musical piece indicated by a point 59 is specified as a candidate piece of Type 18.

The display screen of the candidate pieces in the second embodiment is identical to that shown in FIG. 4. That is, in the second embodiment, the display screen 30 has displayed thereon the musical piece information 31 of the playback piece and the musical piece information 32 through 39 of the candidate pieces. Here, the musical piece information 32 through 39 correspond to the musical piece information of the candidate pieces of Types 11 through 18, respectively. As with the first embodiment, in the second embodiment, each piece of the musical piece information 32 through 39 is displayed on the screen 30 at a position reflecting the position of the musical piece on the impression space, that is, corresponding to the impression of the musical piece. That is, a lively candidate piece is displayed on the upper side of the screen, whilst a calm candidate piece is displayed on the lower side of the screen. Also, a cheerful candidate piece is displayed on the right side of the screen, whilst a melancholic candidate piece is displayed on the left side of the screen.

In the second embodiment, a similar piece may be further displayed on the screen 30. For example, in place of the musical piece information of the musical piece currently being played, the musical piece information of a candidate piece as a similar piece may be displayed at the center position on the screen. That is, musical piece information 31 may be musical piece information of a candidate piece as a similar piece.

As described in the second embodiment, the present invention can be applied to even the case where three or more factors are included in the musical piece parameter. That is, in the second embodiment, in consideration of two factors (the active factor and the cheerful/melancholic factor) included in the musical piece parameter, the musical piece information can be displayed on the display screen at a position reflecting a positional relation between these two factors in the impression space. Even when the dimension of the musical piece parameter is four or higher (when the musical piece parameter includes four or more factors), in consideration of arbitrary two factors, the musical piece information can be displayed on the display screen so as to reflect a positional relation between these two factors in the impression space.

Also, in a music reproducing apparatus according to another embodiment, at least one factor included in the musical piece parameter is taken into consideration. That is, the musical piece information is displayed on the display screen so as to reflect a positional relation of at least one factor included in the musical piece parameter in the impression space (refer to the musical piece information 34 and 35 shown in FIG. 4).

In the above first and second embodiments, the music reproducing apparatus receives an instruction of playing the entire candidate piece (one musical piece). Here, in another embodiment, in addition to such an instruction, an instruction of playing only a part of the candidate piece may be received. That is, the music reproducing apparatus may receives an instruction of playing the entire candidate piece (normal playback) and an instruction of playing only a part of the candidate piece (partial playback). The details of the case where only an instruction of playing only a part of the candidate piece is received are described below as an exemplary modification of the first and second embodiments.

In the exemplary modification, the musical piece data storage unit 1 stores information indicative of a part of each musical piece subjected to partial playback. The part subjected to partial playback is assumed to be, for example, a bridge part, that is, the most musically impressive part of the musical piece. Such an impressive part can be calculated by using, for example, a scheme disclosed in Japanese Patent Laid-Open Publication No. 2003-177784. The parameter calculating unit 2 calculates in advance a start point of that part of each musical piece whose data is stored in the musical piece data storage unit 1. Upon receiving an instruction from the input unit 9 of partial playback of a candidate piece, the playback control unit 5 obtains the information indicative of the starting point of that candidate piece from the musical piece data storage unit 1, and then controls the playback unit 4 so that the candidate piece is played at the starting point. That is, when the user gives an instruction of partial playback of a candidate piece, not the entirety of the playback piece is played. Also at this time, the playback control unit 5 does not notify the candidate piece specifying unit 6 that playback of a new musical piece has been started.

When only a part (for example, the bridge part) of the musical piece is played in the above-described manner, the user listens to only that part of the musical piece to determine whether the entire musical piece is to be played. Then, if the user likes the musical piece, the user gives an instruction of normal playback. If no instruction is given from the user even after playback of only the part of the musical piece is completed, a part of another musical piece may be further played.

As described above, in the exemplary modification, only a part of the candidate piece is played, and if the user likes the candidate piece, the candidate piece is played from the beginning. This allows the user to more accurately know the contents of the candidate piece before the entire candidate piece is played.

In the above embodiments, only one candidate piece is specified for one type, and musical piece information of that one candidate piece is displayed for each type. In another embodiment, a plurality of candidate pieces may be presented for each type. For example, when two candidate pieces are specified as musical pieces slightly livelier than the playback piece, two musical pieces may be randomly determined as candidate pieces from musical pieces that satisfy conditions that their emotional factor is larger than that of the playback piece by an amount within a predetermined range. Also, a plurality of musical pieces whose emotional factor is larger than that of playback piece by a predetermined small amount may be determined as candidate pieces. When a plurality of candidate pieces are specified, as with the case where only one candidate piece is specified, any scheme will suffice as long as the scheme uses a musical piece parameter.

Also, the plurality of candidate pieces for one type can be displayed on the display device in the following display format, for example. That is, a plurality of pieces of musical piece information of the candidate pieces may be displayed within a single display area (the musical piece information 31 or 32 shown in FIG. 4). Alternatively, for example, a plurality of display areas may be provided according to the candidate pieces. Specifically, the candidate pieces of the same type may be displayed so as to be aligned from the center of the screen on which the musical piece information of the playback piece is displayed. Still alternatively, with reference to FIG. 4, for example, when two candidate pieces of Type 2 are specified, the display area for displaying the musical piece information 34 shown in FIG. 4 may be overlaid with another display area for displaying another musical piece information. Still alternatively, when a plurality of pieces of musical piece information of the candidate pieces of the same type are displayed so as to be aligned from the center of the screen, those pieces of musical piece information may be displayed so as to be arranged in the order according to the musical piece parameters of the candidate pieces. For example, in the example of FIG. 4, the pieces of musical piece information may be displayed so as to be positioned lower on the screen as the emotional factor is smaller.

The music reproducing apparatus can be used as a jukebox used for a car audio system or the like.

While the invention has been described in detail, the foregoing description is in all aspects illustrative and not restrictive. It is understood that numerous other modifications and variations can be devised without departing from the scope of the invention.

What is claimed is:

1. A music reproducing apparatus that has a display device and plays a musical piece, comprising:
   a musical piece data storage unit operable to store data of a plurality of musical pieces;
   a parameter storage unit operable to store a musical piece parameter obtained by quantifying a feature of each musical piece and represented by at least one factor for each musical piece stored in the musical piece data storage unit;
   a playback unit operable to reproduce data of the musical pieces stored in the musical piece data storage unit;
   a candidate piece specifying unit operable to specify, as a first candidate piece, a musical piece whose musical piece parameter includes a first factor that is larger than a first factor of a musical piece currently being played from among the musical pieces whose data is stored in the musical piece data storage unit, and also to specify, as a second candidate piece, a musical piece whose first factor is smaller than the first factor of the musical piece currently being played from among the musical pieces;
   a display control unit operable, when data of a musical piece is reproduced by the playback unit, to cause musical piece information regarding the first candidate piece to be displayed in a predetermined first direction from a reference position on a screen of the display device, and also to cause musical piece information regarding the second candidate to be displayed in a second direction reverse to the first direction; and
   a playback control unit operable, upon receiving an input from a user of specifying a musical piece indicated by musical piece information displayed on the display device, to control the playback unit so that the playback unit reproduces data of the specified musical piece.

2. The music reproducing apparatus according to claim 1, wherein
   the candidate piece specifying unit specifies, as a third candidate piece, a musical piece whose musical piece parameter includes a second factor that is different from the first factor and is larger than a second factor of the musical piece currently being played from among the musical pieces whose data is stored in the musical piece data storage unit, and also specifies, as a fourth candidate piece, a musical piece whose second factor is smaller than the second factor of the musical piece currently being played from among the musical pieces, and
   when the data of the musical piece is reproduced by the playback unit, the display control unit causes musical piece information regarding the third candidate piece to be displayed in a third direction that is different from the first direction and the second direction, and causes musical piece information regarding the fourth candidate piece to be displayed in a fourth direction reverse to the third direction.

3. The music reproducing apparatus according to claim 1, wherein
   the candidate piece specifying unit specifies, as a fifth candidate piece, a musical piece whose first factor is larger than a predetermined value from among the musical pieces whose data is stored in the musical piece data storage unit, and also specifies, as a sixth candidate piece, a musical piece whose first factor is smaller than the predetermined value from among the musical pieces, and when the data of the musical piece is reproduced by the playback unit, the display control unit causes musical piece information regarding the fifth candidate piece to be displayed in the first direction, and also causes musical piece information regarding the sixth candidate piece to be displayed in the second direction.

4. The music reproducing apparatus according to claim 1, wherein the candidate piece specifying unit specifies, as a seventh candidate piece, a musical piece whose first factor is larger than a first predetermined value and whose musical piece parameter includes a second factor that is different from the first factor and is larger than a second predetermined value from among the musical pieces whose data is stored in the musical piece data storage unit, specifies, as an eighth candidate piece, a musical piece whose first factor is larger than the first predetermined value and whose second factor is smaller than the second predetermined value from among the musical pieces, specifies, as a ninth candidate piece, a musical piece whose first factor is smaller than the first predetermined value and whose second factor is larger than the second predetermined value from among the musical pieces, and specifies, as a tenth candidate piece, a musical piece whose first factor is smaller than the first predetermined value and whose second factor is smaller than the second predetermined value from among the musical pieces, and when the data of the musical piece is reproduced by the playback unit, the display control unit causes musical piece information regarding the seventh candidate piece to be displayed in the first direction, causes musical piece information regarding the tenth candidate to be displayed in the second direction, causes musical piece information regarding the eighth candidate piece to be displayed in a third direction that is different from the first direction and the second direction, and causes musical piece information regarding the ninth candidate piece to be displayed in a fourth direction reverse to the third direction.

5. The music reproducing apparatus according to claim 1, wherein the display control unit causes musical piece information regarding the musical piece whose data is currently being reproduced by the playback unit to be displayed at the reference position.

6. The music reproducing apparatus according to claim 5, wherein the candidate piece specifying unit uses the musical piece parameter to specify, as a similar candidate piece, a musical piece whose musical piece parameter is similar to a musical piece parameter of the musical piece currently being played from among the musical pieces whose data is stored in the musical piece data storage unit, and the display control unit causes musical piece information regarding the similar candidate piece to be displayed in the vicinity of the reference position.

7. The music reproducing apparatus according to claim 1, wherein the candidate piece specifying unit uses the musical piece parameter to specify, as a similar candidate piece, a musical piece whose musical piece parameter is similar to a musical piece parameter of the musical piece currently being played from among the musical pieces whose data is stored in the musical piece data storage unit, and the display control unit causes musical piece information regarding the similar candidate piece to be displayed at the reference position.

8. The music reproducing apparatus according to claim 1, further comprising a musical piece type storage unit operable to store a plurality of pieces of information that are distinguished by using the musical piece parameters and are each indicative of a musical piece's type, wherein the candidate piece specifying unit specifies, as a candidate piece, a musical piece of each type in accordance with the information stored in the musical piece type storage unit, and the display control unit causes musical piece information regarding each candidate piece to be displayed on the display device so that a direction from the reference position on the screen of the display device to a position where the musical piece information is to be displayed is associated with a direction from a predetermined position to a position of each candidate piece in an impression space with each factor of the musical piece parameters being a coordinate axis.

9. The music reproducing apparatus according to claim 1, wherein the playback control unit receives an input for playback of a part of a musical piece indicated by the musical piece information displayed on the displayed device, and controls the playback unit so that the playback unit reproduces data of the part of the musical piece.

10. The music reproducing apparatus according to claim 1, wherein the first factor is represented by a value that is larger as the musical piece gives a more lively impression to listeners and is smaller as the musical piece gives a calmer impression to the listeners.

11. A music reproducing method for use in a music reproducing apparatus that has a display device and plays a musical piece, the music reproducing apparatus including:

a music data storage unit operable to store data of a plurality of musical pieces; and a parameter storage unit operable to store a musical piece parameter obtained by quantifying a feature of each musical piece and represented by at least one factor for each musical piece stored in the musical piece data storage unit, the method comprising the steps of:

reproducing data of the musical pieces stored in the musical piece data storage unit;

specifying, as a first candidate piece, a musical piece whose musical piece parameter includes a first factor that is larger than a first factor of a musical piece currently being played from among the musical pieces whose data is stored in the musical piece data storage unit, and also specifying, as a second candidate piece, a musical piece whose first factor is smaller than the first factor of the musical piece currently being played from among the musical pieces;

causing, when data of a musical piece is reproduced by the playback unit, musical piece information regarding the first candidate piece to be displayed in a predetermined first direction from a reference position on a screen of the display device, and also causing musical piece information regarding the second candidate piece to be displayed in a second direction reverse to the first direction; and controlling, upon receiving an input from a user of specifying a musical piece indicated by musical piece information displayed on the display device, data of the specified musical piece so that the data of the specified musical piece is reproduced in the reproducing step.

12. A program to be executed by a computer of a music reproducing apparatus that has a display device and plays a musical piece, the music reproducing apparatus including:
- a musical piece data storage unit operable to store data of a plurality of musical pieces; and
- a parameter storage unit operable to store a musical piece parameter obtained by quantifying a feature of each musical piece and represented by at least one factor for each musical piece stored in the musical piece data storage unit, the program causing the computer to execute steps comprising:
- reproducing data of the musical pieces stored in the musical piece data storage unit;
- specifying, as a first candidate piece, a musical piece whose musical piece parameter includes a first factor that is larger than a first factor of a musical piece currently being played from among the musical pieces whose data is stored in the musical piece data storage unit, and also specifying, as a second candidate piece, a musical piece whose first factor is smaller than the first factor of the musical piece currently being played from among the musical pieces;
- causing, when data of a musical piece is reproduced by the playback unit, musical piece information regarding the first candidate piece to be displayed in a predetermined first direction from a reference position on a screen of the display device, and also causing musical piece information regarding the second candidate piece to be displayed in a second direction reverse to the first direction; and
- controlling, upon receiving an input from a user of specifying a musical piece indicated by musical piece information displayed on the display device, data of the specified musical piece so that the data of the specified musical piece is reproduced in the reproducing step.

13. A computer-readable recording medium having recorded thereon the program according to claim 12.

* * * * *